United States Patent Office 3,349,245
Patented Oct. 24, 1967

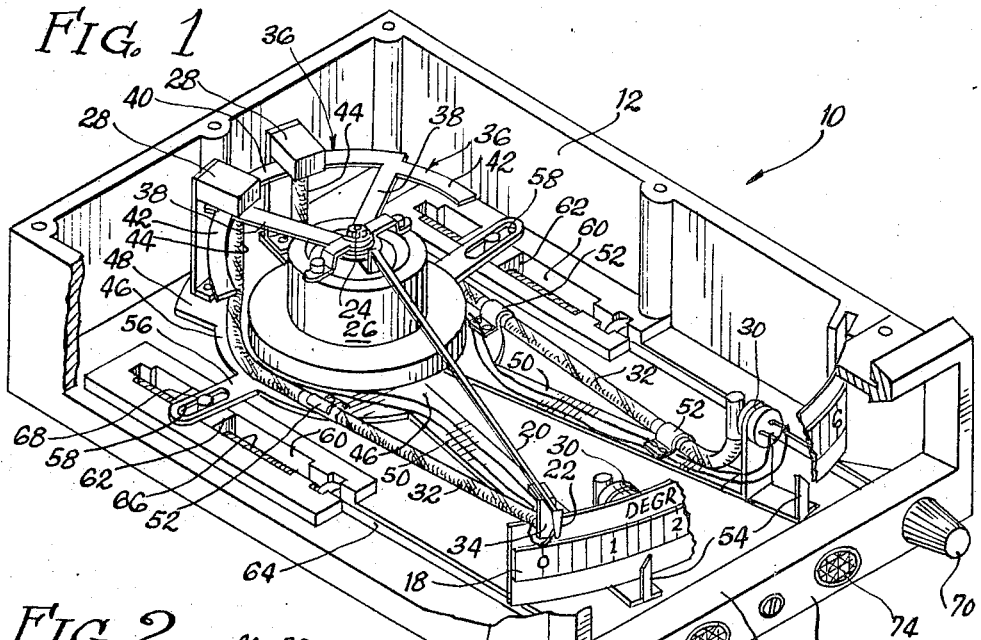

3,349,245
CONTROL CONSTRUCTION TO MAINTAIN A RANGE OF VARIABLES USING LIGHT CONDUCTING ROD
Gerald R. Hosker, London, Ontario, Canada, assignor to American Gage & Machine Company, Chicago, Ill., a corporation of Illinois
Filed Aug. 24, 1965, Ser. No. 482,177
10 Claims. (Cl. 250—231)

This invention relates to a control instrument adapted to be employed in various systems. In particular, the description of the invention will relate to the use of a control instrument for applications which involve changes in conditions, with the instrument being adapted to initiate controls when the conditions reach certain predetermined points.

There are many applications for control instruments of the type described. In a common application, controls are necessary for furnaces or other constructions whereby the temperature conditions can be maintained below or above a certain level or within a specified range. Other conditions such as humidity, barometric pressure, etc., are also desirably controlled in certain circumstances.

The invention also provides a control instrument which can be utilized for applications which do not directly involve the control of atmospheric conditions or the like. For example, in various operations which employ meters for measuring certain functions, it is often necessary to provide controls, or to generate signals when the meter readings reach certain limits or move out of certain specified ranges. It will be understood when considering the following disclosure and claims that the references to "conditions" apply to conditions such as atmospheric conditions as well as to any other factors which provide variations adapted to be measured on a scale or the like.

In the construction of control instruments, certain difficulties frequently arise. In certain cases, such difficulties relate to the reliability of the instruments from the standpoint of operating characteristics. Thus, control devices of certain designs are incapable of achieving a high degree of sensitivity and a high degree of accurate operation over a long period of time. For example, control instruments which require mechanical engagement of elements, such as meter needles, with switches or the like to generate a control signal, are often unreliable due to the difficulty in regulating frictional characteristics, due to wear problems and due to the effects of atmospheric conditions.

Instruments are available which eliminate any mechanical engagement, for example instruments employing photo-sensitive means which are brought into operation at desired control points. It has been found, however, that such instruments are often characterized by poor ballistics and are not reliable where maximum sensitivity is required. Furthermore, such instruments can be relatively expensive when manufactured to provide a high degree of sensitivity and reliability of operation for extended periods. It has also been found that it is extremely difficult to achieve a high degree of reliability of operation while at the same time providing a relatively compact unit. Thus, the complexity of designs which achieve high accuracy tends to increase the size of the instrument, and this is considered undesirable for many applications.

It is one object of this invention to provide improved control instruments which are characterized by a high degree of reliability and sensitivity whereby the instruments can be employed for controlling operations which require highly accurate control means.

It is a further object of this invention to provide control instruments of the type described which eliminate operating characteristics such as mechanical engagement of the control elements, whereby the instruments are adapted to function in a manner substantially independent of conditions tending to distort the operating characteristics of the instrument.

It is a still further object of this invention to provide an instrument of the type described which is adapted to achieve the foregoing objects while providing a relatively inexpensive arrangement which can be assembled within a relatively confined space.

These and other objects of this invention will appear hereinafter and for purposes of illustration but not of limitation, specific embodiments of this invention are shown in the accompanying drawings in which:

FIGURE 1 comprises a perspective view, partly cut away, of a control instrument characterized by the features of this invention;

FIGURE 2 is a fragmentary view of a portion of an instrument comprising an alternative form of the invention; and, FIGURE 3 is a cross-sectional view of the instrument shown in FIGURE 1.

The control construction of this invention is employed in combination with an instrument which includes a member which is movable in response to changes in conditions to which the instrument is subjected. For example, in the case of a furnace operation, a needle will be adapted to move in response to changes in temperature. The improvement of this invention comprises a means associated with the instrument adapted to operate when the conditions being measured or regulated reaches a specific point. More particularly, the invention relates to means which operate when the movable member referred to reaches a position corresponding to the point of the condition involved.

The specific improvement of this invention involves the use of means for generating energy in the form of a beam or the like and means for detecting the energy beam. The detecting means contemplated comprise means which will react to the detection of the energy beam whereby various operating functions can be undertaken. Photo-sensitive means which react to a beam of light and which are adapted to operate relays and the like are contemplated. Radioactive detection systems can also be utilized while other reactive systems having the ability to transmit and detect energy which is confined in a beam or other well-defined path are also contemplated. As will become more apparent from the following description, a beam of energy is necessary since the ability to interrupt the transmission is a necessary characteristic for operation of this invention. Obviously, a light beam can be interrupted by means of an opaque member while a radioactive beam can be interrupted by means of appropriate shielding elements.

In one preferred manner of achieving the objects of this invention, there are employed elements including a light source and a photo-sensitive means. A light guide is interposed between the light source and photo-responsive means whereby a path for light is provided. A first flag comprising a control flag is operatively connected to the movable member of the instrument whereby the path for the light is adapted to be interrupted when the movable member reaches a specific point. A second flag comprising a memory flag is also associated with the movable member whereby the path of light will continue to be interrupted as the movable member moves beyond the control point. The members including the needle or other movable member and the respective flags are arranged in a particular manner whereby ideal operating characteristics can be achieved in the construction.

An alternative form of the invention comprises an arrangement which may employ structural elements corresponding to several of the elements in the aforementioned form of the invention. Thus, this alternative arrangement utilizes a control flag and a memory flag. Each of these flags is associated with a movable member for purposes of interrupting light beams to achieve control functions.

In this second form of the invention, light sources and photo-sensitive means are associated with each of the flags while light guides are not employed. With respect to the first form of the invention, the movable member including the control flag and memory flag is ballistically designed whereby maximum sensitivity can be achieved. The respective embodiments of this invention are each characterized by an operating system which provides for the complete separation of the control and memory sensing functions. The control flag is located near the tip of the pointer to provide the best possible resolution and minimum error of indication of a control point.

The memory function is less demanding from a resolution standpoint, and can be located on a smaller radius. This enables the location of the memory flag on the side of the movement axis opposite the main body of the indicating pointer and control flag. A counterbalance is achieved which provides a high degree of reliability and sensitivity. The respective locations of the control flag and memory flags provides for the best possible resolution as well as full scale memory. This is achieved without any significant increase in the mass of the deflection instrument.

FIGURE 1 illustrates a control instrument 10 which includes a housing 12. The front face 14 of the housing defines a window 16 whereby a scale plate 18 can be viewed. The scale plate may be provided for visibly indicating the condition, such as temperature, which the instrument is measuring. It will be appreciated, however, that the operation of this invention does not require an arrangement of the specific type illustrated.

A needle 20 having a pointer 22 at its extremity is adapted to move relative to the scale plate 18. The opposite end of the needle 20 is mounted for pivotal movement about the axis 24. The element 26 comprises a movement responsive to a condition and for purposes of illustration, it will be assumed that the needle 20 moves across the face of the scale plate 18 in response to variations in temperature. It will be obvious, however, that any type of condition-responsive movement is contemplated.

In the arrangement illustrated in FIGURE 1, a pair of light sources 28 are mounted behind the movement 26. A pair of photo-sensitive detectors 30 are mounted adjacent the scale plate 18, and light guides 32 are located between the respective light sources 28 and detectors 30. The light guides may comprise flexible fiber light guides of a conventional design; however, it is preferred that rigid plastic or glass light guides be employed since these are available at lower cost and provide a sturdier construction. A reflecting member 33 provides for total internal reflection within the light guides.

The needle 20 carries a control flag 34. This control flag is spaced behind the pointed 22, and as best shown in FIGURE 3, the photo-sensitive element 30 as well as the scale plate 18 are interposed between the control flag and pointer.

At the opposite end of the needle 20, there is provided a memory flag 36. As best shown in FIGURE 3, the memory flag is on the opposite side of the pivotal axis 24 of the needle 20. An important operating characteristic of this invention relates to the balance which can be achieved in the system by reason of the arrangement described. Thus, the memory flag 36 provides a counterbalance with respect to the combination of the needle 20, flag 34 and pointer 22. The balanced unit described can be mounted on needle bearings or the like, and when properly balanced, extremely reliable operation can be achieved.

The memory flag includes legs 38 which extend radially outwardly from the pivot point 24. An arcuate center portion 40 is defined by this flag, and arcuate wing portions 42 extend on either side of the central portion 40. In the arrangement of the instrument shown in the drawings, the wing portions 42 are adapted to be interposed between the ends 44 of the light guides 32 and the light sources 28. The central arcuate portion 40 of the memory flag is offset with respect to the wing portions 42 whereby a free path for the light is provided when the needle 20 is within a certain range of the scale.

The light sources 28 and the detecting means 30 are each mounted whereby they can be adjustably positioned within the construction. The mounting is achieved by means of separate mounting plates 46 which are disposed adjacent the bottom of the construction. The mounting plates include extensions 48 for mounting the respective light sources as well as legs 50 which provide a mounting for the detecting means 30 near their ends. The light guides 32 are attached by means of clamp members 52.

Each of the mounting plates 46 includes an upwardly extending pointer 54. This pointer is positioned to extend in front of the scale plate 18 whereby the pointer will be visible through the window 16.

The mounting plates each include an arm 56 defining a slot 58. The arms extend over channels 60 and crossheads 62 are slideably positioned within each of these channels. Control shafts 64 include threaded portions 66 which are received by the crossheads 62. The crossheads also define upwardly extending pins 68 which interfit with the slots 58.

Knobs 70 are attached to the ends of the control shafts 64, and these knobs are accessible from the outside of the housing 12. Rotation of the control shafts by means of the knobs 70 results in sliding movement of the respective crossheads in the channels 60 with the direction of movement depending upon the direction of rotation of the knobs. As the crossheads move, the interaction of the pins 68 with the arms 56 will result in movement of the mounting plates 46. Accordingly, the pointers 54, located at the ends of the legs 50, can be moved to adjust the positions of these pointers with respect to the scale plate.

This arrangement is extremely desirable since it makes possible very accurate adjustment of the instrument. Thus, it will be noted that the movement of the mounting plate 46 moves the detecting means 30 to a degree corresponding to the movement of the pointers 54. Accordingly, adjustment of the pointer positions provides for adjustment of the location at which the control flag 34 will interrupt the light paths. The securing of the light guides and the light sources to the mounting plates insures that a light path will at all times be accurately provided in the system.

The construction shown in FIGURE 2 embodies many of the operating characteristics described above. This arrangement thus provides a pointer 20 having an indicating needle 22 for passing over a scale surface. The memory flag 36 and control flag 34 are associated with the pointer 20. Mounting plates 46 are provided for carrying light sources and photo-sensitive means. These mounting plates are adjustable in the same manner as described with reference to FIGURE 1.

Light sources 28 are mounted on the respective plates 46. Opposite each of the light sources, there is provided a photo-sensitive member 90. The memory flag 36 operates to alternatively block and unblock the path of light beams between the sources 28 and sensing means 90.

A second set of light sources 92 are mounted on the legs 50 of the mounting plates. Photo-sensitive elements 94 are also mounted on the legs. The light sources and sensing means 92 and 94 are spaced apart to permit movement of the control flag 34 between them.

The operation of the systems illustrated will be described with reference to a furnace operation. It will be assumed that controls are to be actuated whenever the temperature of the furnace is outside of the temperature range confined between the pointers 54. If the temperature drops below the point indicated by the left-hand pointer 54, the controls may provide for activation of an alarm or the like whereby steps can be taken to prevent the furnace from cooling off to an undesirable level.

An increase in temperature above the point designated by the right-hand pointer 54 will provide for deactivation of the heating means and it may also provide for more positive action in the form of the activation of cooling means, if desired. It will be noted that the front face 14 of the panel provides locations for lights 72 and 74. These lights can serve as auxiliary means for indicating whether or not the furnace is in the proper condition. On the other hand, the lights could be activated by the photo-sensitive means to serve as warning lights whereby an operator can be apprised of the need for taking action to achieve proper furnace conditions.

In the condition of the instrument illustrated in FIGURE 1, the pointer 22 indicates that the temperature is below a desired minimum point designated by the left-hand pointer 54. In this furnace condition, the left-hand wing 42 of the memory flag blocks the light path whereby an alarm or other signal will indicate the need for heat. As the temperature increases and approaches the point designated by the left-hand pointer 54, the control flag 34 will interrupt the light path. Finally, when the temperature goes beyond this point, the light beam will be completed between the light source and detecting means. In this condition, the furnace heating means will stay on automatically.

If the furnace temperature rises to an undesirable upper level, the control and memory flags can provide for actuation of means adapted to correct the temperature. This may involve further deactivation of heating means or the operation of positive cooling means. It will be noted that the described arrangement provides a built-in safety feature since the heating means will be automatically deactivated whenever the light path is blocked. If a power failure in the line for the light sources 28 should occur, the furnace will not automatically operate.

In the arrangement shown in FIGURE 2, the mounting bracket 96 for the light source 28 and photo-sensitive means 90 is in a different position than the corresponding bracket of FIGURE 1. This different location of the mounting bracket provides for blocking of the light beam between these elements when the central segment 40 of the memory flag is interposed between the elements. This alternative is illustrated for the sole purpose of illustrating the versatility of the construction from the standpoint of desired control operations. Obviously, various positions for the various brackets are possible, depending on the control system desired.

As explained with reference to FIGURE 1, the respective light beams are blocked only by the wings 42 of the memory flag. Accordingly, when the needle 22 is between the indicators 54 on the scale, the right-hand beam will be blocked as the needle ascends while the left-hand beam will be blocked as the needle descends on the scale. The arrangement of FIGURE 2, on the other hand, provides for blocking of the left-hand beam as the needle ascends from the position shown. The right-hand beam will in turn be blocked when the needle continues to ascend to the point where the right-hand wing 42 moves into the path of the right-hand beam.

The above operating characteristics and the following description is provided solely to illustrate the capabilities of the disclosed apparatus. Obviously, other combinations can be obtained when utilizing the concepts of this invention. For example, the above description is directed to the use of the invention wherein pointers are set at the upper and lower ends of a scale. It will be obvious, however, that a single combination of the arrangements of FIGURES 1 or 2 could be utilized to provide for control at one point on a scale. For example, the left-hand pointer 54 and the associated mounting plate could be used alone to provide a thermostatic control. It will also be obvious that temperature controls comprise only one application of the instant invention.

The construction of this invention provides extremely desirable performance characteristics for various reasons. The construction of the movable needle 20 which provides a small control flag at the tip of the needle and a relatively large memory flag at the opposite end of the needle provides extremely desirable ballistic performance. The counterbalance effect which is achieved when the weight of the respective elements is carefully proportioned provides a high degree of sensitivity, speed of response and highly suitable damping. This construction also avoids the need for unduly complicated adjustments which could not be retained particularly where the instrumentation involved is subjected to vibrations or other rough treatment.

The use of the light guides also comprises an important additional aspect of the invention. These light guides enable positioning of the light sources and detector means in locations which permit an extremely compact arrangement of parts. This advantage of the invention is best illustrated when considering the "quadrant" design of the memory flag. The operating portions of the memory flag can be located immediately behind the axis of the needle for best operating results. As clearly illustrated in the drawings, the curvilinear characteristics of the light guides permit a memory flag design while also permitting the location of the operating elements within a relatively confined space.

The design of the pointer and associated flags is important from the standpoint of operating characteristics as well as from the standpoint of providing a compact construction. The relatively small mass of the control flag and the fact that this flag is mounted at right angles with respect to the needle minimize any problem of mechanical interference due to vibrational effects. The memory flag is flat and is located in the plane of rotation of the needle, this configuration being possible because of the small working radius of this flag and due to the fact that it is less vulnerable to vibration.

The use of a relatively low deflection angle of 45° for the needle 20 makes possible a number of useful refinements in the mechanical design of the instrument. The two control arm mounting plates 46 function independently without "crossover" and without any possibility of mutual friction to interfere with precise setting of the control points. The optical paths do not cross and the layout affords a tidy and accessible assembly with considerable volume remaining available for any additional components, amplifiers, etc., that may be needed in either the deflection or the control circuits.

Choice of components in the optical systems is conditioned by a number of requirements. The exciter lamps preferably should have a very long life expectancy. This objective can be achieved by using miniature filament bulbs having a high minimum (4000 hours) and high average (60,000 hours) life and operating them at reduced input, which further increases their potential service life and reliability. A gallium arsenide photo-emitting diode or a laser can be utilized.

To minimize self-heating and to assure reliable operation over widely varying temperature and power supply conditions, it is of course desirable that the optical systems should have a high over-all efficiency. This involves the transmission characteristics of the light guides as well as the color temperature of the lamps and the preferred spectrum for the photodetectors. For the latter, light-activated silicon controlled rectifiers can permit direct operation of relays without intervening amplification. These devices will also operate at very high ambient temperatures; however, it is necessary to supply them with alternating current. For minimum dead-band in nonproportioning controllers, it is preferred to use those components having a very small active area including germanium and silicon photo-diodes and certain types of cadmium-sulphide and lead-sulphide cells. Each type requires appropriate further amplification, although phototransistors may also be used.

Although the most frequent need is for ON–OFF action going upscale at the upper control point and ON–OFF going downscale at the lower control point, it will be appreciated from the above description that some applications may call for the inverse action at either control point. The former condition permits a symmetrical memory flag as in the layout described, a very desirable condition since the static and dynamic balance of the moving system is involved. When the alternate control condition is required, it is obtained by mounting the exciter lamp in such a position as to make use of the reverse end of the memory flag with an appropriately shorter light guide then being used. When the control action is so inverted, the effective control point will be displaced by the angular width of the detector flag. It is then not possible to have zero interval between upper and lower control points; however, the minimium displacement is small and is not significant in normal applications.

The response of an indicating instrument to a change of input signal or other condition is subject to a hysteresis effect due to bearing friction. In an electrical instrument having pivot-and-jewel bearings, the friction effect is minimized by operating the instrument with the movement axis in or near the vertical (scale horizontal). If the instrument deflection sensitivity is moderately high, the friction component should not exceed 0.5% of full-scale signal value; less sensitive instruments, having a higher level of restoring torque provided by stronger springs, will exhibit less friction. Where extremely high sensitivity is required or where very little hysteresis can be tolerated, the use of taut-band suspension will be preferred. Electrical instruments so equipped will have negligible hysteresis due to friction or other causes, even at the highest levels of deflection sensitivity. Pneumatic or hydraulic gauge mechanisms will also have friction hysteresis though usually of small order in well-designed movements because of the relatively large deflection forces available.

The accuracy of this type of control instrument (considered as an indicator) will be that of the comparable type of meter (or gauge) and will not be influenced by the presence of the control mechanism. Practical figures will range from ±2% down to ±0.5% of full scale value, according to the requirements and the type of movement used.

With the type of construction described, errors of control point indication are removed by adjustment during calibration. Since detection of pointer position takes place at point very close to the pointer tip, error of control point indication does not occur as the set point is traversed across the scale.

In the system described, it will be obvious that the respective positions of the light source and detector means could be reversed. It is also contemplated that flexible light guides could be employed. In such an instance, a light source which is stationary with respect to the housing could be utilized and the flexibility of the light guide would then insure a path for light transmission when adjustments in the control point are made. Finally, the description has been confined to simple ON–OFF control action although it is contemplated that the flags employed could provide for proportionality with respect to the control operations. A control flag could be tapered or made of a material having a progressively changing optical density whereby the current passed by a photocell would change progressively. The changing current could then be employed to regulate with the use of silicon controlled rectifiers or the like. Obviously, a plurality of photocells which are arranged for differential exposure to light could also be utilized in a similar system.

It will be understood that various changes and modifications may be made in the control construction described which provide the characteristics of this invention without departing from the spirit thereof particularly as defined in the following claims.

That which is claimed is:

1. In a control construction including a movable member and means for moving said member to different positions responsive to changes in conditions, the improvement in said construction comprising a light source, a photo-sensitive detecting means, a light guide located between said source and said detecting means providing a path for transmitting light, a control flag and a memory flag operatively connected to said movable member, said control flag being adapted to be interposed in said path when said member reaches a predetermined position, and said memory flag being adapted to be interposed in said path as said member moves beyond said position, and including a mounting member, said source and said detecting means being connected to said mounting member at the opposite ends thereof, said light guide comprising a rigid light transmitting element extending along the length of said mounting member between said source and said detecting means and being attached to said mounting member, an arm extending outwardly from said mounting member, and means connected to said arm for adjusting the position of said mounting member with said source, said detecting means and said light guide being automatically repositioned during such adjustment.

2. A construction in accordance with claim 1 including a scale means, a pointer secured to said mounting member and adapted to be set in position relative to said scale means, said source, said detecting means, and said light guide being thereby operatively connected to said pointer whereby the setting of the pointer determines the point that said control flag is interposed in said path.

3. A construction in accordance with claim 2 including pairs of said light sources and photo-responsive detecting means, and a pair of said light guides located between the respective light sources and detecting means to provide separate paths for transmitting light, said control flag being adapted to be interposed in one of said paths when said needle moves to either of a first or second position defined by said scale.

4. A construction in accordance with claim 3 wherein said control flag comprises an arc-shaped member attached to said movable member, the control flag comprising a centrally located arc portion, and two arc-shaped wing portions extending outwardly from either side of said centrally located portion, said wing portions being offset with respect to said centrally located arc portion.

5. A construction in accordance with claim 2 wherein said movable member comprises an elongated indicating needle movable relative to said scale, said needle having a base portion connected to a condition-responsive element whereby changes in conditions operate to move said needle.

6. A construction in accordance with claim 5 wherein said control flag is connected at the outer extremity of said needle at a location adjacent said scale, and wherein said memory flag is connected adjacent the base portion of said needle.

7. A construction in accordance with claim 6 wherein said memory flag and said control flag are located in diametrically opposite positions with respect to said base portion, and wherein the memory flag and the combination of said needle and control flag substantially counterbalance one another.

8. A construction in accordance with claim 1 wherein said control flag comprises a relatively thin member of relatively small width extending substantially perpendicularly away from said needle.

9. A construction in accordance with claim 1 wherein said control flag comprises a relatively thin sheet member positioned substantially parallel to the plane of movement of said needle, and including at least one wing member adapted to be interposed in said path.

10. A construction in accordance with claim 3 including first and second pointers adapted to be fixed in position relative to said scale plate, said first source and detecting means and one of said light guides being operatively connected to said first pointer and said second source and detecting means and a light guide being operatively connected to said second pointer whereby the respective positions of said pointers determine the points at which said control flag is interposed in one of said paths.

References Cited

UNITED STATES PATENTS

| | | | |
|---|---|---|---|
| 3,028,503 | 4/1962 | Stevenson | 250—231 |
| 3,045,223 | 7/1962 | Kapany et al. | 250—227 |
| 3,249,759 | 5/1966 | Sendro | 250—231 |

RALPH G. NILSON, *Primary Examiner.*

M. ABRAMSON, *Assistant Examiner.*